United States Patent
Liu et al.

(10) Patent No.: US 7,792,260 B2
(45) Date of Patent: Sep. 7, 2010

(54) METHOD FOR PROTECTING INCOMING CALLS IN COLORING RING BACK TONE SERVICE

(75) Inventors: Haijun Liu, Shenzhen (CN); Jin Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 926 days.

(21) Appl. No.: 11/630,612

(22) PCT Filed: Jun. 22, 2004

(86) PCT No.: PCT/CN2004/000661

§ 371 (c)(1),
(2), (4) Date: Dec. 22, 2006

(87) PCT Pub. No.: WO2005/125222

PCT Pub. Date: Dec. 29, 2005

(65) Prior Publication Data

US 2009/0180605 A1    Jul. 16, 2009

(51) Int. Cl.
H04M 3/42     (2006.01)
H04M 7/00     (2006.01)

(52) U.S. Cl. .............. 379/201.02; 379/87; 379/207.02; 379/207.16; 379/221.08; 379/221.09; 379/221.11; 379/221.12; 379/373.03; 379/373.04; 455/414.1

(58) Field of Classification Search ............ 379/201.01, 379/201.02, 207.02, 207.16, 221.08, 221.09, 379/221.11, 221.12, 373.01–376.01; 455/414.1
See application file for complete search history.

(56) References Cited

U.S. PATENT DOCUMENTS 7,174,009 B1* 2/2007 Zhang et al. ........... 379/221.01

2005/0243989 A1* 11/2005 Lee et al. ............... 379/207.16

FOREIGN PATENT DOCUMENTS

| CN | 1335015     | 2/2002  |
| CN | 1543231     | 11/2004 |
| KR | 2004013330  | 2/2004  |
| KR | 20040039111 | 5/2004  |

OTHER PUBLICATIONS

International Search Report for Internatioanl Application No. PCT/CN2004/00061 dated Mar. 31, 2005.

* cited by examiner

*Primary Examiner*—Harry S Hong

(57) ABSTRACT

A method for protecting incoming calls in coloring ring back tone service, wherein comprising: the service switching point device sends a message for triggering intelligent networks service to the service control point device; the service control point device instructs the service switching point device to connect the call to the intelligent peripheral; the service control point device reports the connect result and reason to the service control point device; the service control point device analyzes the connect result as well as its reason, if there is a need to protect the call, the service control point device will instruct the service switching point device to connect the called number directly; again, the service switching point device sends a message for triggering intelligent network service to the service control point device; the service control point device sends down the continue message, and the service switching point device will connect the called number. The present invention improves the coloring ring back tone service logic, thereby preventing the service control point device from releasing the call upon receiving a message of call failure, and improving the call completing rate during utilizing coloring ring back tone service.

5 Claims, 3 Drawing Sheets

METHOD FOR PROTECTING INCOMING CALLS IN COLORING RING BACK TONE SERVICE

FIELD OF THE INVENTION

The present invention relates to a technology for protecting incoming calls, and specifically to a method for protecting incoming calls in coloring ring back tone service which is realized by employing intelligent network.

BACKGROUND ART

Coloring ring back tone service is a value-added service in communication service, and it renders a calling party able to listen to the coloring ring back tone, such as a piece of music, which is customized by the called party during call waiting.

The coloring ring back tone service can be realized in many ways, for example, Chinese Application No. 03113374.6 provides a method for realizing coloring ring back tone by employing intelligent network, which is specifically as follows: when a calling party makes a call, a calling/called switch triggers an intelligent network service (i.e. a first intelligent network service), and the first intelligent network service instructs the calling/called switch to connect the call to an intelligent peripheral, then the intelligent peripheral triggers a coloring ring back tone service (i.e. a second intelligent network service), and the coloring ring back tone service instructs the intelligent peripheral to connect to the called party, meanwhile displays the coloring ring back tone to the calling party.

In this method, when the first intelligent network service instructs the calling/called switch to connect the call to the intelligent peripheral, it is likely to rise a problem that the called party cannot be connected, since the relay from the switch to the intelligent peripheral is occupied, the out relay of the intelligent peripheral is occupied, or the intelligent peripheral fails in triggering service. If such a problem arises, for a user, it means the user has applied for a new service, but the completing rate declines, which incurs users' dissatisfaction about telecom service. Hence, the above mentioned problem can be solved if the protection of incoming calls in coloring ring back tone service can be realized, however, no technical documents describing such similar technical solution have been found.

SUMMARY OF THE INVENTION

To solve above-described technical problems, the present invention provides a method for protecting incoming calls in coloring ring back tone service, thereby raising the completing rate of the call utilizing coloring ring back tone service, and reducing the cases that a user cannot receive incoming calls for utilizing the coloring ring back tone service.

In the method for protecting incoming calls in coloring ring back tone service of the present invention, the system which provides coloring ring back tone service comprises a service control point device, a service switch point device, and an intelligent peripheral, and the service control point device respectively interacts information with the service switch point device and the intelligent peripheral by Signaling No. 7, the service switch point device interacts information with the intelligent peripheral through telephone user party signaling; and said method comprising the following:

setting reason data which need incoming call protection at the service control point device;

a calling party initiating a call at the service switch point device, and the service switch point device sending a message for triggering intelligent network service to the service control point device;

the service control point device instructing the service switch point device to connect the call to the intelligent peripheral;

the service switch point device connecting the call to the intelligent peripheral, and reporting connect result and reason to the service control point device;

the service control point device analyzing the connect result and reason, and matching the reason of connect failure with the reason data which need incoming call protection, if the matching fails, incoming call protection will not proceed;

if the matching succeeds, the service control point device instructing the service switch point device to connect the called number directly;

the service switch point device resending a message for triggering intelligent network service to the service control point device; and the service control point device sending down a message for continuing, and the service switch point device connecting the called number.

The present invention improves the coloring ring back tone service logic, thereby preventing the service control point device from releasing the call upon receiving a message of call failure, raising the completing rate of the call utilizing coloring ring back tone service, and then the problem that a user may not receive calls for utilizing the coloring ring back tone service is solved.

EMBODIMENTS FOR CARRYING OUT THE PRESENT INVENTION

The technical solution of the present invention is further described in detail in conjunction with the drawings and embodiments of the present invention.

Figure 1:
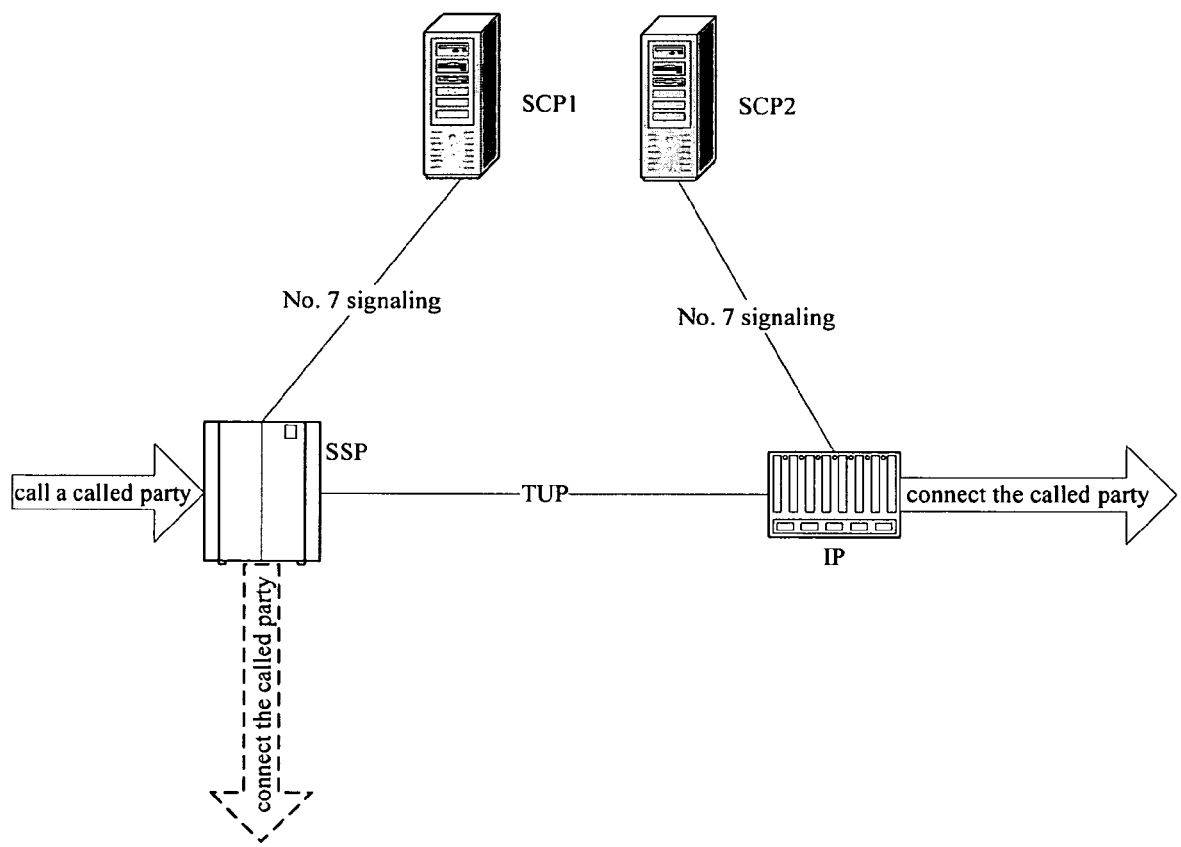
FIG. 1 is a schematic view of the system which realizes coloring ring back tone service by employing intelligent network.

FIG. 1 is a schematic view of the system which realizes coloring ring back tone service by employing intelligent network, and is also the system utilized by the method of the present invention. The system consists of a service control point device, a service switch point device, and an intelligent peripheral, wherein the service control point device can be divided into two service control point devices: service control point device 1 and service control point device 2. In the above-mentioned system, the service switch point device triggers a first intelligent network service (also referred to as guiding service) to the service control point device 1 by No. 7 signaling according to a call request of a calling party, and connects the call to the intelligent peripheral according to instructions, and can also triggers intelligent network service the second time according to the connect instructions sent down by the service control point device 1; the service control point device 1 is configured to control the connect processes of incoming calls done by the service switch point device; the service control point device 2 is configured to control the operations of the intelligent peripheral, and the intelligent peripheral is mainly configured to display coloring ring back tone to the calling party when the connect succeeds.

In order to realize incoming call protection, reason data which needs incoming call protection are firstly set at the service control point device 1, and such reason data, defined according to the actual situation of the networks, refers to the reason value which can connect to the called terminal directly through the service switch point device again when the service switch point device fails in connecting to the intelligent peripheral or the intelligent peripheral fails in connecting to the called terminal, for example, it is instructed in ACM message received by the service switch point device returned from the intelligent peripheral that "no circuit to the called terminal home network is available", it is a reason that the incoming call protection is needed.

In actual realization of the protection, a table shown as follows can be employed to store the event reason values that the called party of coloring ring back tone cannot be connected due to the problems of the network.

| Reason Value | Reason |
| --- | --- |
| 2 | No route to specified transit network (national use) |
| 3 | No route to destination |
| 6 | Channel unacceptable |
| 25 | Exchange routing error |
| 27 | Destination out of order |
| 34 | No circuit/channel available |
| 38 | Network out of order |
| 42 | Switching equipment congestion |
| 44 | Requested circuit/channel not available |
| ... | ... |

The reason values in the above table are all defined in No. 7 signaling.

Figure 2:
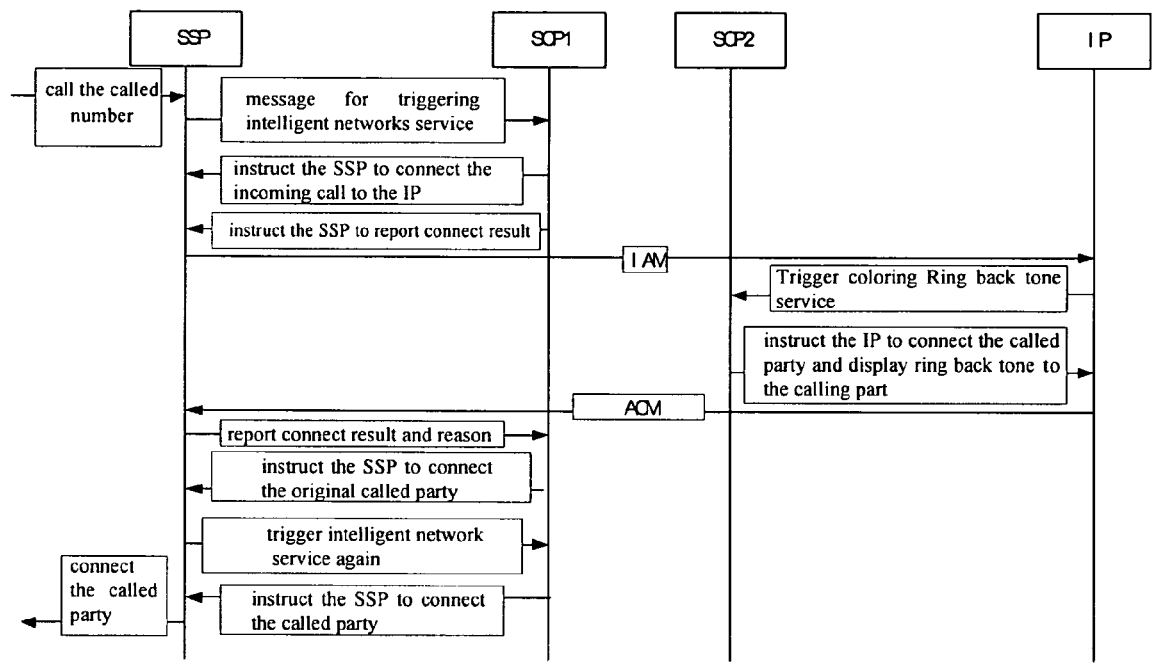
FIG. 2 is a schematic view of the signaling flow of the method of the present invention.

FIG. 2 describes a signaling flow among the service switch point device, the service control point devices 1 and 2, and the intelligent peripheral when protection on the incoming calls of the user utilizing coloring ring back tone service is conducted.

First, the calling party calls the number of the called party, No. 7 signaling message IAM reaches the service switch point device, the service switch point device sends a message for triggering intelligent network service to the service control point device 1, and a message for triggering intelligent network service appears as an IDP message in PHS system or in GSM system.

The service control point device 1 conducts authentication on the called number, and after confirming that it is a user utilizing coloring ring back tone service, sends an intelligent network connect instruction, which appear as a CONNECT message in PHS system or in GSM system, to the service switch point device, and instructs the service switch point device to connect the call to the intelligent peripheral. Generally, the service control point device 1 modifies the called number as "intelligent peripheral prefix plus original called number" in the CONNECT message, and instructs the service switch point device to connect the called number modified. Meanwhile, the service control point device 1 instructs the service switch point device to report connect result and reason, and in PHS system or in GSM system, the service control point device 1 sends instructions through a RRBE message.

The service switch point device sends IAM message to the intelligent peripheral, and if the intelligent peripheral receives the IAM message, it sends the message for triggering intelligent network service to the service control point device 2, such as IDP message. If the service switch point device fails in sending IAM message, it reports the connect result and reason to the service control point device 1.

After receiving the message for triggering intelligent network service, the service control point device 2 instructs the intelligent peripheral to connect the called number, and waits for reporting the connect result and reason by the intelligent peripheral, and the type of the ACM message reported by the intelligent peripheral are instructed by the service control point device 2 using the RRBE message, such as the message that the incoming call is completed and the message that the called party is busy. Then the intelligent peripheral encapsulates the contents of the ACM message into an intelligent network protocol message ERB according to the ACM message returned by the called end office, and reports the connect result and reason to the service control point device 2. If the service control point device 2 receives an alerting message, it instructs the intelligent peripheral to display customized coloring ring back tone to the calling party, which indicates that connecting the called party succeeds, and then normal call connect flow proceeds. And if what is received by the service control point device 2 is not the alerting message, it indicates that the connect fails, and the service control point device 2 does not send the instruction for displaying the coloring ring back tone to the intelligent peripheral.

Meanwhile, the intelligent peripheral returns the received ACM message to the service switch point device, and the service switch point device reports the connect result and reason to the service control point device 1 after receiving the ACM message, and in PHS system or GSM system, the service switch point device reports the connect result and reason by the ERB message. Then the service control point device 1 analyzes the reason reported, if the reason for connect failure is due to the network which is pre-set and need incoming call protection, the service control point device 1 instructs the service switch point device to connect again, and in PHS system or GSM system, the service control point device 1 sends a CONNECT message to the service switch point device, wherein the called number is the called number originally dialed by the calling party.

The specific processes of analyzing the reason report are as follows: check if the connect result is "called party busy", if not, it indicates that the incoming call has been connected to the called party, and no incoming call protection is needed; and if yes, judge whether the reason for "called party busy" is "user terminal is busy", including that the called party is calling, the called party is power off, the called party refuses the connect, and the like, if the reason is so, it also indicates that the incoming call has been connected to the called terminal, and no incoming call protection is needed; and if the reason is not so, the received reason value is compared with the pre-set reason data, if they match with each other, then prepare for the protection on incoming calls; and if they do not match with each other, it indicates that no incoming call protection is needed, and proceed according to the original processing flow.

If incoming call protection is needed, the service control point device 1 instructs the service switch point device to directly connect the called number. The service switch point device again triggers the same service at the service control point device 1 according to the instruction. Then the service control point device 1 checks whether the value of the "original called number" parameter in the service triggering data has been filled in, whether the parameter is the same as the called number, and whether forwarding reason is unconditional, and if yes, it can deemed that this triggering is conducted according to the connect instruction sent down by the service control point device 1 secondly, then the service control point device 1 sends down a message for continuing, which appears as CONTINUE in PHS system or in GSM system, to the service switch point device. The service switch point device directly connects the called number, if the called party answers the incoming call, the calling party talks with the called party, or else, the incoming call is released.

Figure 3:
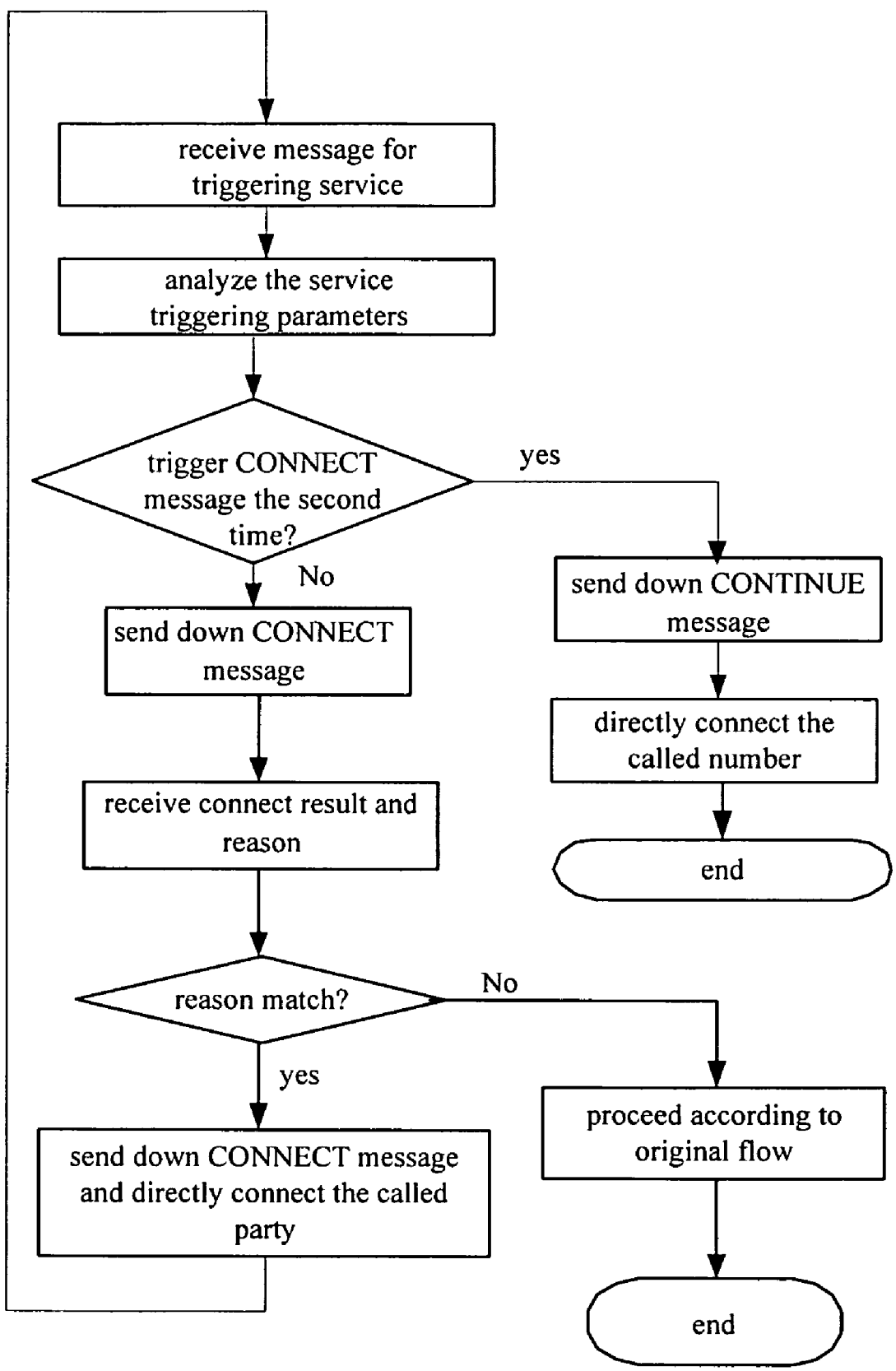
FIG. 3 is a flow schematic view of the service logic at the side of the service control point device of the method of the present invention.

FIG. 3 is a schematic view of the incoming call protection logic at the side of the service control point device 1 of the method of the present invention, and in the following, the pre-paid service of PHS system or GSM system is taken as an example to describe one specific embodiment of the method for protecting incoming calls in the present invention.

Request for calling the user who utilizes coloring ring back tone service is first triggered to the service control point device 1, and the service control point device 1 processes the call request, and judges whether the value of the "original called number" parameter in the service triggering data has been filled in, whether the parameter is the same as the called number, and whether forwarding reason is unconditional, if yes, it can deemed that this incoming call is triggered according to the connect message sent down by the service control point device 1 secondly, then set "mark of coloring ring back tone function call" as FALSE, and send down the RRBE and CONTINUE message to protect the incoming calls.

If this incoming call is not triggered by the connect message sent down the second time, the service control point device 1 sends down a CONNECT message to the service switch point device, wherein the called number is: intelligent peripheral prefix plus original called number. The service switch point device connects the incoming call to the intelligent peripheral, and simultaneously records the incoming call as "coloring ring back tone function incoming call".

The service control point device 1 sends down the CONNECT message, and meanwhile requires the service switch point device to report the connect result and reason. The service switch point device reports the ERB message after receiving the ACM message returned by the intelligent peripheral and the service control point device 1 judges whether there is a need to send down the CONNECT message secondly according to the reason value in ERB. The specific judging method is as follows:

If the event in the ERB message is not "called party is busy", proceed according to the normal service flow; if the event is "called party is busy", the service control point device 1 further judges the reason of the event, if the reason value is 17, it indicates that the user terminal is busy (such as being calling), then proceed according to the normal service flow; or else, compare the event reason with the reason data that need incoming call protection; if the event reason is not the reason for incoming call protection, proceed according to the original service flow, or else, the service control point device 1 sends down a CONNECT message again, wherein the called number is filled in as the original called number.

After receiving the CONNECT message, the service switch point device triggers intelligent network service again, and sends triggering message IDP to the service control point device 1, and the above mentioned processes are repeated.

While the present invention has been particularly shown and described with reference to the embodiments thereof, it will be understood by those skilled in the art that any amendment or equivalent replacement made to the technical solution of the present invention without departing from the spirit and scope of the present invention shall all be covered by the scope of the claims of the present invention.

What is claimed is:

1. A method for protecting an incoming call in a coloring ring back tone service, wherein a system which provides the coloring ring back tone service comprises a service control point device, a service switch point device and an intelligent peripheral, and the service control point device respectively interacts information with the service switch point device and the intelligent peripheral by Signaling No. 7, the service switch point device interacts information with the intelligent peripheral by a part of signaling of a telephone user; and said method comprises:

setting reason data that need an incoming call protection at the service control point device;

a calling party initiating a call to the service switch point device, and the service switch point device sending a message for triggering an intelligent network service to the service control point device;

the service control point device instructing the service switch point device to connect the call to the intelligent peripheral;

the service switch point device connecting the incoming call to the intelligent peripheral, and reporting a connect result and a connect failure reason to the service control point device;

the service control point device analyzing the connect result and the connect failure reason, and matching the connect failure reason for a connect failure with the reason data that need the incoming call protection, wherein if matching between the connect failure reason and the reason data that need the incoming call protection fails, the incoming call protection does not proceed;

if the matching succeeds, the service control point device instructs the service switch point device to connect a called number directly;

the service switch point device sending the message for triggering the intelligent network service to the service control point device again; and the service control point device sending down a continue message to the service switch point device, and the service switch point device connecting the called number.

2. The method for protecting an incoming call in a coloring ring back tone service according to claim 1, wherein the reason data that need the incoming call protection is a network reason of connect failure defined in No. 7 Signaling, the network reason of connect failure comprising: no route to specified transmitting network, no route to destination, channel is unacceptable, exchange routing has an error, destinations are out of order, no circuit/channel is available, networks are out of order, switching equipment congestion, and the requested circuit/channel is not available.

3. The method for protecting an incoming call in a coloring ring back tone service according to claim 1, wherein the step that the service switch point device connects the incoming call to the intelligent peripheral and reports the connect result and the connect failure reason to the service control point device further comprises:

the service switch point device sending an IAM message to the intelligent peripheral;

if the intelligent peripheral receives the IAM message, then it sends the message for triggering the intelligent network service to the service control point device; the service control point device instructs the intelligent peripheral to connect the called number, and waits for the intelligent peripheral to report the connect result and the connect failure reason; the intelligent peripheral reports the connect result and the connect failure reason to the service control point device according to an ACM message returned by a called end office; if the service control point device receives an alerting message, it instructs the intelligent peripheral to display a customized coloring ring back tone to the calling party, and then a normal call connect flow proceeds; and if the message received by the service control point device is not the alerting message, it indicates that a connect fails, and the service control point device does not instruct the intelligent peripheral to display the coloring ring back tone; the intelligent peripheral returns the received ACM message to the service switch point device; and the service switch point device reports the connect result and the connect failure reason to the service control point device 1; and if the service switch point device fails in sending the IAM message, it reports the connect result and the connect failure reason to the service control point device.

4. The method for protecting an incoming call in a coloring ring back tone service according to claim 1, wherein the step that the service control point device analyses the connect result and the connect failure reason further comprises: checking if the connect result is "called party is busy", if not, it indicates the incoming call has been connected to the called party, and need no incoming call protection; and if yes, judges whether the connect failure reason of "called party is busy" is "user terminal is busy", if so, it indicates that the incoming call has reached the called terminal, and no incoming call protection is needed, and if not, compares a received reason value with preset reason data, if they match with each other, prepare for the incoming call protection, and if they do not match with each other, it indicates that no incoming call protection is needed, and an original processing flow proceeds.

5. The method for protecting an incoming call in a coloring ring back tone service according to claim 1, wherein the message for triggering the intelligent network service sent by the service switch point device to the service control point device again comprises parameters of the original called number which have been filled in, and the values of the parameters are the same as the called numbers and a forwarding reason is unconditional.

\* \* \* \* \*